(12) United States Patent
Lean et al.

(10) Patent No.: US 8,694,349 B2
(45) Date of Patent: Apr. 8, 2014

(54) METHOD AND SYSTEM OF TRANSFERRING A PROMOTION INFORMATION FOR SOCIAL-LOCAL-MOBILE BASED COMMUNITY

(75) Inventors: Geng-Chyun Lean, Tainan (TW); Jing-Fung Chen, New Taipei (TW)

(73) Assignee: Institute for Information Industry, Taipei (TW)

( * ) Notice: Subject to any disclaimer, the term of this patent is extended or adjusted under 35 U.S.C. 154(b) by 7 days.

(21) Appl. No.: 13/484,260

(22) Filed: May 30, 2012

(65) Prior Publication Data

US 2013/0325614 A1    Dec. 5, 2013

(51) Int. Cl.
*G06Q 10/00* (2012.01)
(52) U.S. Cl.
USPC ..................................... 705/7.11
(58) Field of Classification Search
USPC ..................................... 705/7.11
See application file for complete search history.

(56) References Cited

U.S. PATENT DOCUMENTS

| 6,766,245 | B2 * | 7/2004 | Padmanabhan | 701/409 |
| 8,140,403 | B2 * | 3/2012 | Ramalingam et al. | 705/26.1 |
| 8,229,819 | B2 * | 7/2012 | Ransom et al. | 705/35 |
| 2009/0030787 | A1 * | 1/2009 | Pon et al. | 705/14 |
| 2011/0191184 | A1 * | 8/2011 | Blackhurst et al. | 705/14.57 |

* cited by examiner

*Primary Examiner* — Romain Jeanty
(74) *Attorney, Agent, or Firm* — CKC & Partners Co., Ltd.

(57) ABSTRACT

The present invention provides a method for transferring a promotion information for a community. The method includes setting a business region, which has a center and a radius. A landmark building is selected to be the center of the business region. Next, a store data is accessed from a store located in the business region. The store data includes a first GPS location of the store and an associated promotion information of the store. Then, a second GPS location from a wireless communication device is accessed. Finally, a promotion information is sent to the wireless communication device when the first GPS location is closed to the second GPS location.

17 Claims, 3 Drawing Sheets

METHOD AND SYSTEM OF TRANSFERRING A PROMOTION INFORMATION FOR SOCIAL-LOCAL-MOBILE BASED COMMUNITY

TECHNICAL FIELD

The present disclosure relates to a method of transferring information, and more particularly to a method and system of transferring promotion information for social-local-mobile based communication.

BACKGROUND

Mobile communications systems continue to grow in popularity and have become an integral part of both personal and business communications. Mobile telephones allow users to place and receive voice calls most anywhere they travel. Moreover, with the rapid development of mobile telephone technology, different types of mobile devices equipped with various functionality are available to consumers. For example, many mobile devices now incorporate therewith personal digital assistant (PDA) features such as calendars, address books, task lists, etc. Moreover, the mobile devices may also allow users to wirelessly send and receive electronic mail (email) messages and access the Internet via such as a cellular network and/or a wireless local area network (WLAN.

As a result, the users continue to spend more time in their mobile devices everyday, contrary to their ancestor of cellular phones with only functionality of voice call, which has resulted in a significant interest of business for community loaded with the mobile devices.

SUMMARY

The present invention discloses a communication system for transferring a promotion information for a community. The wireless communication device comprises a server, a store and a wireless communication device. The server is configured to set a business region. The business region has a center and a radius. A landmark building is selected to be the center of the business region. The store communicates with the server and is located in the business region. The store has a store data including a first Global Positioning System (GPS) location and a promotion information of the store. The wireless communication device also communicates with the server. The wireless communication device has a GPS function to provide a second GPS location of the wireless communication device. The server accesses the store data from the store and accesses the second GPS location from the wireless communication device. The promotion information is sent to the wireless communication device when the first GPS location is closed to the second GPS location.

In an embodiment, the landmark building is an office building, an apartment, a hospital or a city hall of the business region.

In an embodiment, the promotion information comprises a game application program, and the wireless communication device performs the game application program to get a coupon of the store.

In an embodiment, the wireless communication device is also for storing the coupon, and the store further accesses the coupon to verify the coupon.

In an embodiment, the store verifies the expiration date of the coupon.

In an embodiment, the coupon is a bar-code or a universal product code (UPC), and the store has a reader to read the bar-code or the universal product code (UPC).

In an embodiment, the wireless communication device is also for transferring the promotion information to Social Networking Sites.

The present invention provides a method for transferring a promotion information for a community. The method includes setting a business region. The business region has a center and a radius. A landmark building is selected to be the center of the business region. Next, a store data is accessed from a store located in the business region. The store data includes a first GPS location of the store and an associated promotion information of the store. Then, a second GPS location from a wireless communication device is accessed. Finally, a promotion information is sent to the wireless communication device when the first GPS location is closed to the second GPS location.

Accordingly, by setting a certain business region, a specific community can be selected. The stores in the certain business region may concentrate their promotion for the specific community. Moreover, according to the GPS data from the wireless communications device brought by a user, a corresponding promotion information is informed to the user. Therefore, an exactly promotion mat be achieved.

BRIEF DESCRIPTION OF THE DRAWINGS

In order to make the foregoing as well as other aspects, features, advantages, and embodiments of the present disclosure more apparent, the accompanying drawings are described as follows.

DETAILED DESCRIPTION

Figure 1:
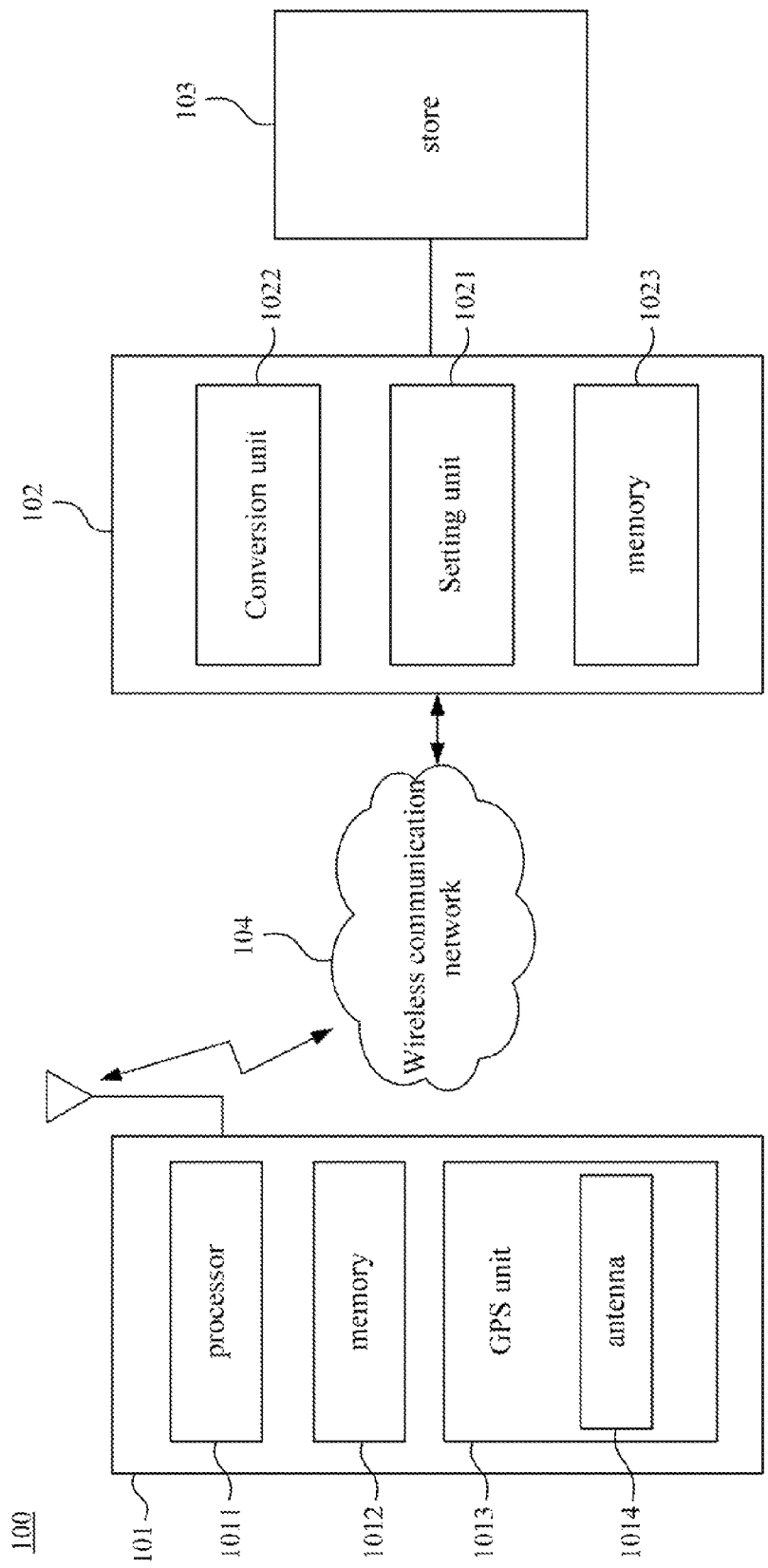
FIG. 1 is a schematic block diagram of a Social-Local-Mobile (SoLoMo) based community communication system providing mobile wireless communications device promotion information in accordance with an embodiment.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a schematic block diagram of a SoLoMo based community communication system providing mobile wireless communications device promotion information in accordance with an embodiment. The SoLoMo based community communication system 100 illustratively includes one or more mobile wireless communications devices 101, a definition server 102 for providing consumption information, one or more physical stores 103 and a wireless communications network 104. The definition server 102 defines a business region for operating a business for SoLoMo based community. The wireless communications devices 101 communicate with the definition server 102 through wireless communications network 104. The physical store 103 in this business region wired or wireless communicates with the definition server 102.

The definition server 102 includes a setting unit 1021, a conversion unit 1022 and a memory. The setting unit is used to set a certain business region for operating a business for SoLoMo based community. By setting a certain business region, a specific community can be selected. The stores in the certain business region can concentrate their promotion for the specific community. In an embodiment, the setting unit 1021 selects a landmark as a center for setting a certain business region. The landmark can be an office building, an apartment, a hospital or a city hall. Next, the setting unit 1021 set a radius to designate this certain region. For example, a main business activity in a region is to provide the necessary of workers in an office building. The workers (including visitors) are the main customers in this region. Therefore, the setting unit 1021 selects this office building as a center for setting the certain business region. Because of the limitation of the working hours, it is impossible for the workers to walk too far to buy something. Therefore, a radius is set to designate this business region. In an embodiment, the radius is 0.5~1 Km. In another embodiment, the radius is the distance that the workers can walk to from the business building in a walking time. The walkings time is adjusted based on the working population. For example, when a daily working population is less than 100 employees in a region, these employees may not create much business activity in a region. Therefore, a shorter radius is designated to set this certain business region. In contrast, when a daily working population is more than 10,000 employees in a region, it is necessary to provide much business activity to satisfy the necessary of these employees. Therefore, a longer radius is designated to set this certain business region. That is, the radius is set according to the walking time from 15 minutes to one hour.

After this business region is set, the conversion unit 1022 is configured to transform this business region into a map. The map is computer-based simulation. The physical store 103 in this business region wired or wireless communicates with the definition server 102 to input their store data. The conversion unit 1022 is also configured to accept the input store data. The store data includes GPS data and promotion information that are stored in the memory 1023. The promotion information is related to the GPS data. The GPS data corresponds to the physical store's 103 location. The conversion unit 1022 transforms the GPS data into a location on this map. That is, all the stores located in the business region and transferring their data to the definition server 102 are shown in the map. A user may interact with the stores in the map before he visits physical stores. For example, he/she may check this map to see what promotion information provided by a store before he/she visits this store. In an embodiment, these map and corresponding store data is configured as a mobile application programs (APP) for location-based service for the wireless communications device 101 and the physical store 103 to download.

The wireless communications device 101 includes a processor 1011, associated memory 1012 and a GPS unit 1013. The processor 1011 runs the mobile application program for location-based service downloaded from the definition server 102 to get promotion information, such as a store's coupon, of a store located in the business region to store in the memory 1012. The GPS unit 1013 can be coupled to the processor 1011. In various embodiments, GPS unit 1013 may include a GPS antenna 1014. GPS antenna 1014 receives GPS data sent from any suitable source. GPS data corresponds to the wireless communications device's 101 location. GPS antenna 1014 also sends the GPS data to the processor 1011. Therefore, when a user brings this wireless communications device 101 to visit a store in the business region, according to the GPS data, the processor 1011 gets a corresponding promotion information from the definition server 102 and represents this information in the display of the wireless communications device 101. In an embodiment, the definition server 102 provides an on-line game about this store and asks the user whether to run this game to get a store's coupon or not. When the user accepts to run this game, this game application program is performed by the processor 1011 to get a store coupon and store in the memory 1012. In an embodiment, the store's coupon is a bar-code or a universal product code (UPC).

Figure 2:
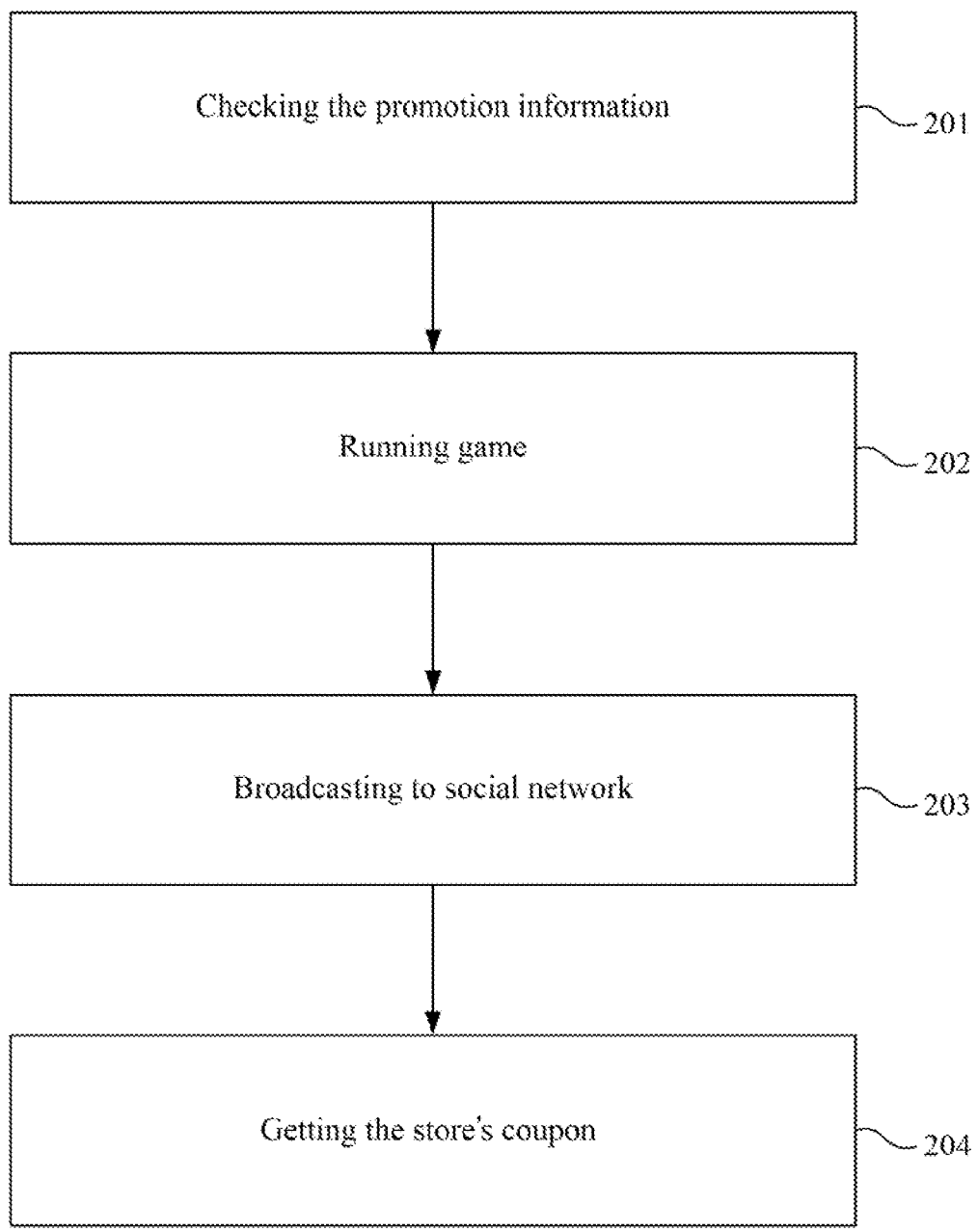
FIG. 2 is a flow chart of using the SoLoMo based community communication system to get promotion information in accordance with an embodiment.

FIG. 2 is a flow chart of using the SoLoMo based community communication system to get promotion information in accordance with an embodiment. FIG. 1 and FIG. 2 are referred. In step 201, a promotion information is provided to a user based on a GPS data. In an embodiment, after a definition server 102 sets a business region, when the user brings a wireless communications device 101 that communicates with the definition server 102 and has the mobile application program for location-based service to visit a store in this business region, according to the GPS data got from the wireless communications device 101, the processor 1011 gets a corresponding promotion information of this store from the definition server 102 and represents this information in the display of the wireless communications device 101 to the user.

In step 202, a corresponding promotion game of this is provided to user form the definition server 102. In an embodiment, for improving the popularity of this store, an interest online game is provided to the user. When the user accepts to run this game, this game application program is ran by the processor 1011 and a store coupon is got to store in the memory 1012. Next, in step 203, the user may broadcast the store information to his friends to share his/her feeling about this consumption. In an embodiment, the user may connect to a Social Networking Sites, such as Facebook, to post an article to talk about this store. Finally, in step 204, a store coupon is transferred to the wireless communications device 101 from the definition server 102. In an embodiment, this online game is performed by the processor 1011 to get a store's coupon. The store's coupon is stored in the memory 1012. In an embodiment, the store's coupon is a bar-code or a universal product code (UPC). Accordingly, the user may use the store's coupon in the store to buy products in a discount price.

Figure 3:
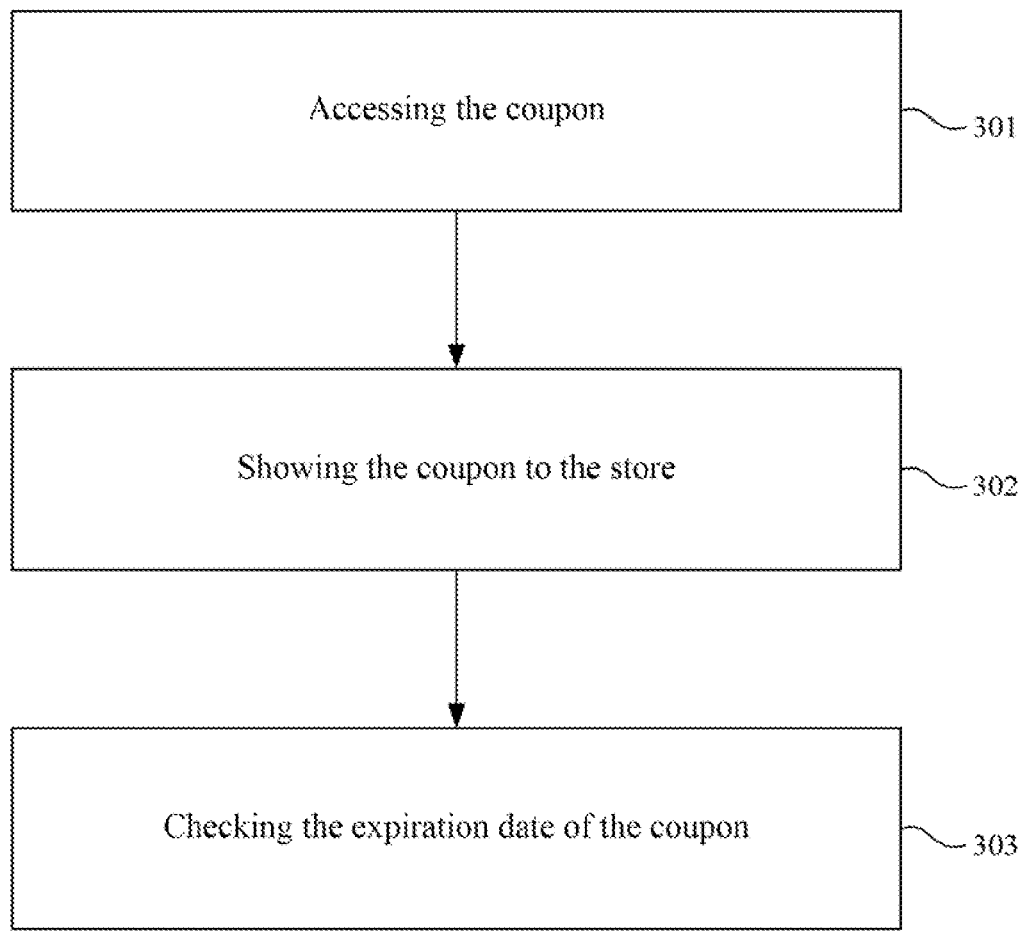
FIG. 3 is a flow chart of using the SoLoMo based community communication system to buy products in accordance with an embodiment.

FIG. 3 is a flow chart of using the SoLoMo based community communication system to buy products in accordance with an embodiment. In step 301, the user accesses the store's coupon. In an embodiment, when the user wants to use a store's coupon to buy products, he/she may access the store coupon from memory 1012. Next, in step 302, the user may show this store's coupon to the store to verify. In an embodiment, the store's coupon is displayed in the display of the wireless communications device 101 to the store to verify. Finally, in step 303, the store verifies this store's coupon. In an embodiment, the store checks the expiration date of the store's coupon to determined whether the store's coupon is expired. If the store's coupon is expired, the store's coupon is deleted. Otherwise, the user may use the store's coupon in the store to buy products in a concessionary price. In an embodiment, the store's coupon is a bar-code or a universal product code (UPC). The store has a reader to read the bar-code or the universal product code (UPC). Accordingly, the wireless communications device 101 may wireless communicate with the reader. The reader reads the bar-code or the universal product code (UPC) to determine whether or not the store's coupon is expired.

Accordingly, by setting a certain business region, a specific community can be selected. The stores in the certain business region may concentrate their promotion for the specific community. Moreover, according to the GPS data from the wireless communications device brought by a user, a corresponding promotion information is informed to the user. Therefore, an exactly promotion mat be achieved.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A communication system for transferring a promotion information for a community, comprising:
    a server configured to set a business region having a center and a radius, wherein a landmark building is selected to be the center of the business region;
    a store communicating with the server and located in the business region, wherein the server has a store data including a first GPS location of the store and a promotion information of the store; and
    a wireless communication device communicating with the server when the wireless communication device in the business region, wherein the wireless communication device has a GPS function to provide a second GPS location of wireless communication device,
    wherein the server accesses the store data from the store and accesses the second GPS location from the wireless communication device, and sends the promotion information to the wireless communication device when the first GPS location is closed to the second GPS location.

2. The communication system of claim 1, wherein the landmark building is an office building, an apartment, a hospital or a city hall of the business region.

3. The communication system of claim 1, wherein the radius is 15 minutes to an one-hour walking distance from the landmark building.

4. The communication system of claim 1, wherein the promotion information comprises a game application program, and the wireless communication device performs the game application program to get a coupon of the store.

5. The communication system of claim 4, wherein the wireless communication device is also for storing the coupon, and the store further accesses the coupon to verify the coupon.

6. The communication system of claim 5, wherein the store verifies the expiration date of the coupon.

7. The communication system of claim 5, wherein the coupon is a bar-code or an universal product code( UPC), and the store has a reader to read the bar-code or the universal product code(UPC).

8. The communication system of claim 1, wherein the wireless communication device is also for transferring the promotion information to Social Networking Sites.

9. The communication system of claim 1, where the server further transforms the business region into a map, and the store is formed on the map based on the first GPS location of the store.

10. A method for transferring a promotion information for a community, comprising:
    setting a business region having a center and a radius by a server, wherein a landmark building is selected to be the center of the business region;
    accessing a store data from a store located in the business region by the server, wherein the store data including a first GPS location of the store and an associated promotion information of the store;
    accessing a second GPS location from a Wireless communication device by the server when the wireless communication device in the business region; and
    sending a promotion information to the wireless communication device by the server when the first GPS location is closed to the second GPS location.

11. The method of claim 10, wherein the landmark building is an office building, an apartment, a hospital or a city hall of the business region.

12. The method of claim 10, wherein the radius is 15 minutes to an one-hour walking distance from the landmark building.

13. The method of claim 10, wherein the promotion information comprises a game application program, and the wireless communication device perform the game application program to get a coupon of the store.

14. The method of claim 13, wherein the wireless communication device is also for storing the coupon, and the store further accesses the coupon to verify the coupon.

15. The method of claim 14, wherein the store verifies the expiration date of the coupon.

16. The method of claim 14, wherein the coupon is a bar-code or an universal product code(UPC), and the store has a reader to read the bar-code or the universal product code (UPC).

17. The method of claim 10, wherein the wireless communication device is also for transferring the promotion information to Social Networking Sites.

* * * * *